Oct. 30, 1928.
L. SOSDIAN
1,690,040
AUTO AXLE FRAME LOCK
Filed May 20, 1927
Fig.1.
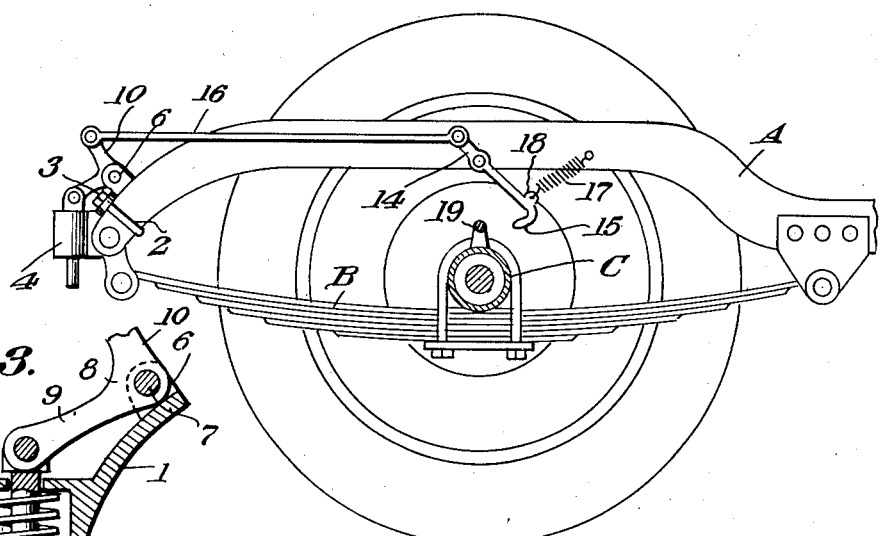
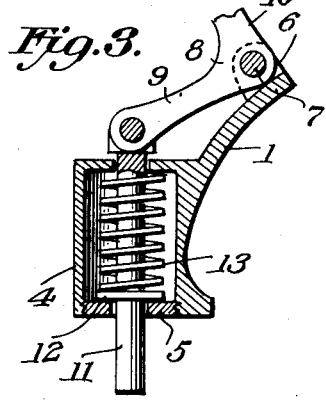
Fig.3.
Fig.2.
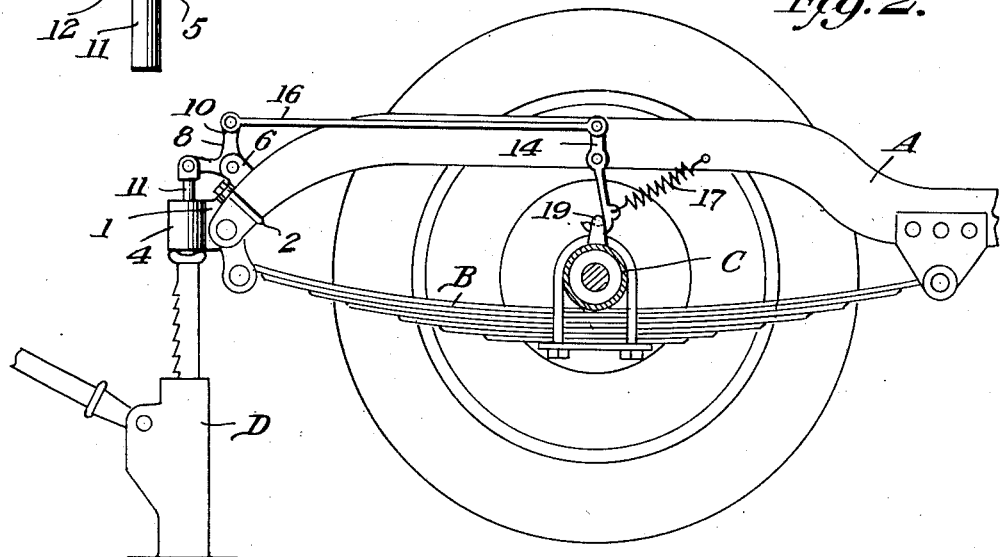
Lorenz Sosdian
INVENTOR
BY Victor J. Evans
ATTORNEY Patented Oct. 30, 1928.

1,690,040

UNITED STATES PATENT OFFICE.

LORENZ SOSDIAN, OF ASBURY PARK, NEW JERSEY.

AUTO AXLE-FRAME LOCK.

Application filed May 20, 1927. Serial No. 193,006.

This invention relates to jacking attachments for vehicles, and its primary object is to provide an attachment securing the vehicle axle and frame together so as to conveniently lift the vehicle.

A further object of the invention is to provide a jacking attachment for vehicles for securing the axle of the vehicle with respect to the frame when lifting the vehicle with a jack or the like, with the result the spring of the vehicle will in no way affect the lifting action.

Another object of the invention is to provide a jacking attachment for motor vehicles, that is actuated by the jack prior to lifting the vehicle.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a sectional view taken through the axle of a motor vehicle and showing parts in elevation and the device forming the subject matter of the present invention applied and in normal position.

Figure 2 is a similar view with the device in operative position.

Figure 3 is a vertical sectional view taken through a portion of the invention.

Referring to the drawings in detail the letter A indicates a portion of the vehicle frame, B the vehicle spring and C the axle housing. While I have shown my device applied to the rear end of a vehicle, it will be obvious that it can be also applied to the front end in the same manner as shown.

The device includes a bracket 1 secured to the frame A through the instrumentality of a U-clip 2 receiving nuts 3 as shown in Figures 1 and 2. The bracket 1 is adapted to follow the shape of the terminal of the frame and has formed therewith a housing 4 which is provided with an opening in its upper end and has its lower end closed by a disk plate 5 threadedly secured therein as best shown in Figure 3. Extending from the bracket and at one end thereof in a manner to be disposed above the housing 4 is a pair of apertured ears 6 between which is pivotally secured by a pin 7 a bell crank lever 8.

The bell crank lever 8 is pivoted between its arms 9 and 10, and pivotally secured to the arm 9 is a plunger rod 11 which is mounted for passage through the opening of the top of the housing and the disk plate 5 respectively. Fixed with the plunger rod is a washer 12 which receives the lower convolution of a coil spring 13 while the upper convolution of said spring engages the top of the housing, with the result, coil spring will normally retain the plunger in its lowermost position as best shown in Figure 3.

Pivotally secured midway its ends to the frame is a lever 14 having its lower end terminating into a hook 15, and pivotally secured to the upper end of said lever is one end of a rod 16 while the opposite end of said rod is pivotally secured to the arm 10 of the bell crank lever 8. Cooperating with the coil spring 13 is a similar spring 17 which has its respective ends secured to the frame and an ear 18 formed with the lever 14 adjacent the hook thereof.

Secured to the axle housing in a manner to rise therefrom is an eyed member 19 which is arranged in the path of the hook 15 to receive the same, as shown in Figure 2 when pressure is applied to the plunger rod for actuating the latter, bell crank arm and rod 16 for moving the lever 14, for that purpose.

From the above description and disclosure of the drawings, it will be obvious that when a lifting device such as a jack D is applied to the plunger rod 11, the hook is moved to be received by the eyed member and further movement of the jack will lift the vehicle without interference from the spring B, with the result the vehicle may be lifted in an easy and expeditious manner with very little effort on the part of the operator and when the vehicle is lowered and the jack released from the plunger rod 11, the springs 13 and 17 will force the device to its normal position as shown in Figure 1.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. In a jacking device for motor vehicles, an eyed member secured to the axle housing of the vehicle, means pivotally secured to the frame and adapted to be received in said eyed member for connecting the frame with the axle housing, means engageable by a lifting means for arranging the hook in the eyed member, and spring means for disengaging the hook upon releasing the lifting means.

2. A jacking attachment for vehicles comprising a bracket, a housing formed with said bracket adapted to be secured to the frame of a vehicle, a plunger rod mounted for movement through said housing in a manner to be engaged by a lifting means, a hooked means pivotally secured to the frame, an eyed member secured to the axle housing of the vehicle, means between the plunger rod and the hooked means for actuating the latter and arranging the same in the eyed member for securing the axle housing with respect to the frame upon movement of the plunger rod upwardly, and spring means for releasing the hooked means.

3. A jacking attachment for vehicles comprising a bracket, means for securing said bracket to the frame of a vehicle, a cylinder formed with said bracket, a plunger rod mounted for movement through said bracket, a bell crank lever having one arm thereof pivotally secured to the plunger rod, means for pivotally securing the bell crank lever to the bracket, a hooked means pivotally secured to the frame, an eyed member secured to the axle of the vehicle and arranged in the path of the hooked means, means between the hooked means and the bell crank lever for actuating the hooked means in one direction from the plunger rod, and spring means for holding the hooked means in normal position.

4. A jacking attachment for vehicles comprising a bracket, a hollow housing secured to said bracket, a plunger rod passing through said housing and terminating below the same, a bell crank lever pivotally secured between its ends to the bracket and having one arm thereof pivotally secured to the plunger rod, a coil spring for urging the plunger rod to its normal position, a hooked means pivotally secured between its ends, an eyed member adapted to receive the hooked means, a rod having its ends pivotally secured to the hooked means and bell crank lever respectively, and a coil spring for retaining the hooked means in normal position.

5. In an automobile axle frame lock, a hooked means carried by the frame of the automobile, means operated by a jack for securing the hooked means with respect to the axle of the automobile and springs for releasing the hooked means upon the removal of the jack from its operating means.

In testimony whereof I affix my signature
LORENZ SOSDIAN.